United States Patent
Zhang et al.

(10) Patent No.: US 9,706,578 B2
(45) Date of Patent: Jul. 11, 2017

(54) SCHEDULING SIGNALING TRANSMISSION METHOD AND DEVICE

(71) Applicant: HUAWEI TECHNOLOGIES CO., LTD., Shenzhen (CN)

(72) Inventors: Jian Zhang, Beijing (CN); Wei Quan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 77 days.

(21) Appl. No.: 14/795,130

(22) Filed: Jul. 9, 2015

(65) Prior Publication Data

US 2015/0312943 A1    Oct. 29, 2015

Related U.S. Application Data

(63) Continuation of application No. PCT/CN2013/070370, filed on Jan. 11, 2013.

(51) Int. Cl.
H04W 74/08    (2009.01)
H04W 36/00    (2009.01)
(Continued)

(52) U.S. Cl.
CPC ... *H04W 74/0833* (2013.01); *H04W 36/0016* (2013.01); *H04W 36/0077* (2013.01);
(Continued)

(58) Field of Classification Search
CPC ... H04W 76/041; H04W 60/04; H04W 80/10; H04W 76/022; H04W 76/04;
(Continued)

(56) References Cited

U.S. PATENT DOCUMENTS

2007/0248064 A1* 10/2007 Shaheen ............... H04W 60/04
370/338
2008/0310395 A1* 12/2008 Kashima ............... H04L 1/1896
370/350
(Continued)

FOREIGN PATENT DOCUMENTS

CN        102231913        11/2011
CN        102438314        5/2012
(Continued)

OTHER PUBLICATIONS

PCT International Search Report dated Oct. 24, 2013 in corresponding International Patent Application No. PCT/CN2013/070370.
(Continued)

*Primary Examiner* — Jung-Jen Liu
(74) *Attorney, Agent, or Firm* — Staas & Halsey LLP

(57) ABSTRACT

The present invention provides a scheduling signaling transmission method and device. The method includes: receiving, by UE, a random access response parameter sent by an eNB, where the random access response parameter is used to indicate that scheduling signaling of a random access response is transmitted through an E-PDCCH; and after sending a random access preamble to the eNB, receiving, by the UE through the E-PDCCH according to the random access response parameter, the scheduling signaling of the random access response. According to embodiments of the present invention, impact of inter-cell interference on scheduling signaling of an RAR can be reduced, thereby shortening a time delay of a random access process.

12 Claims, 5 Drawing Sheets

(51) Int. Cl.
*H04W 72/04* (2009.01)
*H04W 72/12* (2009.01)
*H04W 74/00* (2009.01)

(52) U.S. Cl.
CPC ...... *H04W 72/042* (2013.01); *H04W 72/1289* (2013.01); *H04W 74/006* (2013.01)

(58) Field of Classification Search
CPC ... H04W 84/042; H04W 36/08; H04W 36/12; H04W 80/04; H04W 72/0406; H04W 36/0005; H04W 72/042; H04W 72/0453; H04W 24/08; H04W 72/0446; H04L 27/2601
See application file for complete search history.

(56) References Cited

U.S. PATENT DOCUMENTS

| | | | | |
|---|---|---|---|---|
| 2009/0163211 | A1* | 6/2009 | Kitazoe | H04W 74/0866 455/436 |
| 2009/0316586 | A1* | 12/2009 | Yi | H04W 74/002 370/242 |
| 2010/0254351 | A1* | 10/2010 | Wang | H04J 11/0069 370/332 |
| 2011/0243075 | A1* | 10/2011 | Luo | H04W 74/004 370/329 |
| 2011/0268085 | A1* | 11/2011 | Barany | H04W 36/0033 370/331 |
| 2012/0106465 | A1* | 5/2012 | Haghighat | H04W 72/1289 370/329 |
| 2012/0147830 | A1* | 6/2012 | Lohr | H04W 72/042 370/329 |
| 2013/0136072 | A1* | 5/2013 | Bachmann | H04W 4/00 370/329 |
| 2013/0250925 | A1* | 9/2013 | Lohr | H04W 72/0446 370/336 |
| 2013/0322324 | A1* | 12/2013 | Kim | H04W 36/0077 370/315 |
| 2014/0194124 | A1* | 7/2014 | Xiao | H04W 36/0061 455/437 |
| 2014/0321406 | A1* | 10/2014 | Marinier | H04B 7/024 370/329 |
| 2015/0289078 | A1* | 10/2015 | Kim | H04W 4/005 455/422.1 |
| 2015/0296321 | A1* | 10/2015 | Kim | H04W 8/02 370/329 |
| 2015/0296557 | A1* | 10/2015 | Kim | H04W 4/005 370/331 |

FOREIGN PATENT DOCUMENTS

| | | |
|---|---|---|
| CN | 102498746 | 6/2012 |
| CN | 102624489 | 8/2012 |
| CN | 103220811 | 7/2013 |

OTHER PUBLICATIONS

"3$^{rd}$ Generation Partnership Project; Technical Specification Group Radio Access Network; Evolved Universal Terrestrial Radio Access Network (E-UTRAN); X2 application protocol (X2AP) (Release 11)", 3GPP TS 36.423, V11.3.0, Dec. 2012, pp. 1-141.

"3$^{rd}$ Generation Partnership Project; Technical Specification Group Radio Access Network; Evolved Universal Terrestrial Radio Access Network (E-UTRAN); S1 Application Protocol (S1AP) (Release 11)", 3GPP TS 36.413, V11.2.0, Dec. 2012, pp. 1-272.

"3$^{rd}$ Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, pp. 1-340.

"3$^{rd}$ Generation Partnership Project; Technical Specification Group Radio Access Network; Evolved Universal Terrestrial Radio Access (E-UTRA); Multiplexing and channel coding (Release 11)", 3GPP TS 36.212, V11.1.0, Dec. 2012, pp. 1-82.

International Search Report mailed Oct. 24, 2013 in corresponding international application PCT/CN2013/070370.

\* cited by examiner

SCHEDULING SIGNALING TRANSMISSION METHOD AND DEVICE

CROSS-REFERENCE TO RELATED APPLICATIONS

This application is a continuation of International Application No. PCT/CN2013/070370, filed on Jan. 11, 2013, which is hereby incorporated by reference in its entirety.

TECHNICAL FIELD

The present invention relates to communications technologies, and in particular, to a scheduling signaling transmission method and device.

BACKGROUND

In a Long Term Evolution (LTE) system and a Long Term Evolution Advanced (LTE-A) system, a random access process is classified into a non-contention-based random access process and a contention-based random access process. In random access processes of the both types, user equipment (UE) sends a random access preamble to an evolved NodeB (eNB), and the eNB feeds back a random access response (RAR) message to the UE after receiving the random access preamble.

In random access processes of the foregoing two types, scheduling signaling of the RAR message is transmitted through a physical downlink control channel (PDCCH). Because the PDCCH occupies an entire frequency band, interference from a neighboring cell affects reliability of the scheduling signaling of the RAR, thereby increasing a time delay of a random access process.

SUMMARY

In view of this, embodiments of the present invention provide a scheduling signaling transmission method and device, so as to resolve a problem existing in transmission of scheduling signaling of an RAR through a PDCCH in the prior art.

According to a first aspect, a scheduling signaling transmission method is provided, including:

receiving, by UE, a random access response parameter sent by an eNB, where the random access response parameter is used to indicate that scheduling signaling of a random access response is transmitted through an E-PDCCH; and after sending a random access preamble to the eNB, receiving, by the UE through the E-PDCCH according to the random access response parameter, the scheduling signaling that is of the random access response and that is sent by the eNB.

With reference to the first aspect, in a first possible implementation manner of the first aspect, the receiving, by UE, a random access response parameter sent by an eNB includes:

receiving, by the UE, a random access response parameter sent by a target eNB; or receiving, by the UE, a random access response parameter sent by a serving eNB.

With reference to the first possible implementation manner of the first aspect, in a second possible implementation manner of the first aspect, the receiving, by the UE, a random access response parameter sent by a target eNB includes:

receiving, by the UE, the random access response parameter sent through a source eNB by the target eNB, where the random access response parameter is included in a handover request acknowledge message sent to the source eNB by the target eNB, and included in a handover command sent to the UE by the source eNB; or receiving, by the UE, the random access response parameter that is sent by the target eNB through a target mobility management entity MME, a source MME, and a source eNB, where the random access response parameter is included in a handover request acknowledge sent to the target MME by the target eNB, is included in a forward relocation response sent to the source MME by the target MME, is included in a handover command sent to the source eNB by the source MME, and is included in a handover command sent to the UE by the source eNB; or receiving, by the UE, the random access response parameter that is sent by the target eNB through an MME and a source eNB, where the random access response parameter is included in a handover request acknowledge sent to the MME by the target eNB, is included in a handover command sent to the source eNB by the MME, and is included in a handover command sent to the UE by the source eNB.

With reference to the first possible implementation manner of the first aspect, in a third possible implementation manner of the first aspect, the receiving, by the UE, a random access response parameter sent by a serving eNB includes:

receiving, by the UE, any one of the following messages that include the random access response parameter and are sent by the serving eNB:

a radio resource control (RRC) message, a media access control (MAC) layer message, a physical layer message, and a system broadcast message.

With reference to the first aspect or any one of the first to the third possible implementation manners of the first aspect, in a fourth possible implementation manner of the first aspect, the random access response parameter includes at least one of the following items:

indication information used to indicate whether the UE uses the E-PDCCH to receive the scheduling signaling of the RAR;

configuration information of an E-PDCCH;

configuration information of the E-PDCCH used to transmit the scheduling signaling of the RAR; and indication information used to indicate whether the UE uses a cell-radio network temporary identifier C-RNTI to receive the scheduling signaling of the RAR.

With reference to the first aspect or any one of the first to the fourth possible implementation manners of the first aspect, in a fifth possible implementation manner of the first aspect, the sending, by the UE, a random access preamble to the eNB includes:

sending, by the UE, a first dedicated preamble to the eNB, so that the eNB transmits, through the E-PDCCH, the scheduling signaling of the RAR after receiving the first dedicated preamble; or sending, by the UE, the random access preamble to the eNB, where the random access preamble belongs to a first preamble set, so that the eNB transmits, through the E-PDCCH, the scheduling signaling of the RAR after receiving the random access preamble that belongs to the first preamble set.

With reference to the first aspect or any one of the first to the fifth possible implementation manners of the first aspect, in a sixth possible implementation manner of the first aspect, the method further includes:

receiving, by the UE, grouping information, so that the UE performs processing according to the random access response parameter when determining, according to the grouping information, that the UE belongs to a first group, where UE included in the first group is UE that can receive the scheduling signaling of the RAR through the E-PDCCH, and the grouping information includes:

determining that UE that has an E-PDCCH capability and/or whose current status is a connected state belongs to the first group.

With reference to the sixth possible implementation manner of the first aspect, in a seventh possible implementation manner of the first aspect:

when the grouping information includes determining that the UE that has the E-PDCCH capability belongs to the first group, the grouping information further includes a first dedicated preamble or a first preamble set used by the UE that has the E-PDCCH capability; or when the grouping information includes determining that the UE whose current status is the connected state belongs to the first group, the grouping information further includes a first dedicated preamble or a first preamble set that can be used by the UE whose current status is the connected state; or when the grouping information includes determining that the UE that has the E-PDCCH capability and whose current status is the connected state belongs to the first group, the grouping information further includes a first dedicated preamble or a first preamble set used by the UE that has the E-PDCCH capability and whose current status is the connected state.

With reference to the sixth or the seventh possible implementation manner of the first aspect, in an eighth possible implementation manner of the first aspect, the grouping information and the random access response parameter are transmitted in a same message or transmitted in different messages, and both the grouping information and the random access response parameter may be sent to the UE by using any one of the following messages: an RRC message, a MAC layer message, a physical layer message, and a system broadcast message.

According to a second aspect, a scheduling signaling transmission method is provided, including:

sending, by an eNB, a random access response parameter to UE, where the random access response parameter is used to indicate that scheduling signaling of a random access response is transmitted through an E-PDCCH; and receiving, by the eNB, a random access preamble sent by the UE, and sending the scheduling signaling of the random access response through the E-PDCCH according to the random access preamble, so that the UE receives, through the E-PDCCH according to the random access response parameter after sending the random access preamble, the scheduling signaling that is of the random access response and that is sent by the eNB.

With reference to the second aspect, in a first possible implementation manner of the second aspect, the eNB is a target eNB, and the sending, by an eNB, a random access response parameter to UE includes:

sending, by the target eNB, a handover request acknowledge message to a source eNB, so that the source eNB sends a handover command to the UE after receiving the handover request acknowledge message, where both the handover command and the handover request acknowledge message include the random access response parameter; or sending, by the target eNB, a handover request acknowledge to a target mobility management entity MME, so that the target MME sends a forward relocation response to a source MME after receiving the handover request acknowledge, the source MME sends a handover command to a source eNB after receiving the forward relocation response, and the source eNB sends a handover command to the UE after receiving the handover command sent by the source MME, where the handover command sent by the source eNB, the handover command sent by the source MME, the forward relocation response, and the handover request acknowledge all include the random access response parameter; or sending, by the target eNB, a handover request acknowledge to an MME, so that the MME sends a handover command to a source eNB after receiving the handover request acknowledge, and the source eNB sends a handover command to the UE after receiving the handover command sent by the source MME, where the handover command sent by the source eNB, the handover command sent by the MME, and the handover request acknowledge all include the random access response parameter.

With reference to the second aspect, in a second possible implementation manner of the second aspect, the eNB is a serving base station of the UE, and the sending, by an eNB, a random access response parameter to UE includes:

sending, by the eNB, the random access response parameter to the UE, where the random access response parameter is included in any one of the following messages:

a radio resource control (RRC) message, a media access control (MAC) layer message, a physical layer message, and a system broadcast message.

With reference to the second aspect or the first or the second possible implementation manner of the second aspect, in a third possible implementation manner of the second aspect, the random access response parameter includes at least one of the following items:

indication information used to indicate whether the UE uses the E-PDCCH to receive the scheduling signaling of the RAR;

configuration information of an E-PDCCH;

configuration information of the E-PDCCH used to transmit the scheduling signaling of the RAR; and indication information used to indicate whether the UE uses a cell-radio network temporary identifier C-RNTI to receive the scheduling signaling of the RAR.

With reference to the second aspect or any one of the first to the third possible implementation manners of the second aspect, in a fourth possible implementation manner of the second aspect, the receiving, by the eNB, a random access preamble sent by the UE includes:

receiving, by the eNB, a first dedicated preamble sent by the UE, so that the eNB transmits, through the E-PDCCH, the scheduling signaling of the RAR after receiving the first dedicated preamble; or receiving, by the eNB, the random access preamble sent by the UE, where the random access preamble belongs to a first preamble set, so that the eNB transmits, through the E-PDCCH, the scheduling signaling of the RAR after receiving the random access preamble that belongs to the first preamble set.

With reference to the second aspect or any one of the first to the fourth possible implementation manners of the second aspect, in a fifth possible implementation manner of the second aspect, the method further includes:

sending, by the eNB, grouping information to the UE, so that the UE performs processing according to the random access response parameter when the UE determines, according to the grouping information, that the UE belongs to a first group, where the UE included in the first group is UE that can receive the scheduling signaling of the RAR through the E-PDCCH, and the grouping information includes:

determining that UE that has an E-PDCCH capability and/or whose current status is a connected state belongs to the first group.

With reference to the fifth possible implementation manner of the second aspect, in a sixth possible implementation manner of the second aspect:

when the grouping information includes determining that the UE that has the E-PDCCH capability belongs to the first group, the grouping information further includes a first dedicated preamble or a first preamble set used by the UE that has the E-PDCCH capability; or when the grouping information includes determining that the UE whose current status is the connected state belongs to the first group, the grouping information further includes a first dedicated preamble or a first preamble set that can be used by the UE whose current status is the connected state; or when the grouping information includes determining that the UE that has the E-PDCCH capability and whose current status is the connected state belongs to the first group, the grouping information further includes a first dedicated preamble or a first preamble set used by the UE that has the E-PDCCH capability and whose current status is the connected state.

With reference to the fifth or the sixth possible implementation manner of the second aspect, in a seventh possible implementation manner of the second aspect, the grouping information and the random access response parameter are transmitted in a same message or transmitted in different messages, and both the grouping information and the random access response parameter may be sent to the UE by using any one of the following messages: an RRC message, a MAC layer message, a physical layer message, and a system broadcast message.

According to a third aspect, a scheduling signaling transmission device is provided, including:

a first receiving module, configured to receive a random access response parameter sent by an eNB, where the random access response parameter is used to indicate that scheduling signaling of a random access response is transmitted through an E-PDCCH; and a second receiving module, configured to, after sending a random access preamble to the eNB, receive, through the E-PDCCH according to the random access response parameter, the scheduling signaling that is of the random access response and that is sent by the eNB.

With reference to the third aspect, in a first possible implementation manner of the third aspect, the first receiving module includes:

a first receiving unit, configured to receive a random access response parameter sent by a target eNB; or a second receiving unit, configured to receive a random access response parameter sent by a serving eNB.

With reference to the first possible implementation manner of the third aspect, in a second possible implementation manner of the third aspect, the first receiving unit is specifically configured to:

receive the random access response parameter sent through a source eNB by the target eNB, where the random access response parameter is included in a handover request acknowledge message sent to the source eNB by the target eNB, and included in a handover command sent to the UE by the source eNB; or receive the random access response parameter that is sent by the target eNB through a target mobility management entity MME, a source MME, and a source eNB, where the random access response parameter is included in a handover request acknowledge sent to the target MME by the target eNB, is included in a forward relocation response sent to the source MME by the target MME, is included in a handover command sent to the source eNB by the source MME, and is included in a handover command sent to the UE by the source eNB; or receive the random access response parameter that is sent by the target eNB through an MME and a source eNB, where the random access response parameter is included in a handover request acknowledge sent to the MME by the target eNB, is included in a handover command sent to the source eNB by the MME, and is included in a handover command sent to the UE by the source eNB.

With reference to the first possible implementation manner of the third aspect, in a third possible implementation manner of the third aspect, the second receiving unit is specifically configured to:

receive any one of the following messages that include the random access response parameter and are sent by the serving eNB:

a radio resource control (RRC) message, a media access control (MAC) layer message, a physical layer message, and a system broadcast message.

With reference to the third aspect or any one of the first to the third possible implementation manners of the third aspect, in a fourth possible implementation manner of the third aspect, the random access response parameter received by the first receiving module includes at least one of the following items:

indication information used to indicate whether the UE uses the E-PDCCH to receive the scheduling signaling of the RAR;

configuration information of an E-PDCCH;

configuration information of the E-PDCCH used to transmit the scheduling signaling of the RAR; and indication information used to indicate whether the UE uses a cell-radio network temporary identifier C-RNTI to receive the scheduling signaling of the RAR.

With reference to the third aspect or any one of the first to the fourth possible implementation manners of the third aspect, in a fifth possible implementation manner of the third aspect, the second receiving module is specifically configured to:

send a first dedicated preamble to the eNB, so that the eNB transmits, through the E-PDCCH, the scheduling signaling of the RAR after receiving the first dedicated preamble; or send the random access preamble to the eNB, where the random access preamble belongs to a first preamble set, so that the eNB transmits, through the E-PDCCH, the scheduling signaling of the RAR after receiving the random access preamble that belongs to the first preamble set.

With reference to the third aspect or any one of the first to the fifth possible implementation manners of the third aspect, in a sixth possible implementation manner of the third aspect, the device further includes:

a third receiving module, configured to receive grouping information, so that the UE performs processing according to the random access response parameter when determining, according to the grouping information, that the UE belongs to a first group, where the UE included in the first group is UE that can receive the scheduling signaling of the RAR through the E-PDCCH, and the grouping information includes:

determining that UE that has an E-PDCCH capability and/or whose current status is a connected state belongs to the first group.

According to a fourth aspect, a scheduling signaling transmission device is provided, including:

a first sending module, configured to send a random access response parameter to UE, so that the UE receives, through an E-PDCCH according to the random access response parameter, scheduling signaling of a random access response, where the random access response parameter is used to indicate that the scheduling signaling of the random access response is transmitted through the E-PDCCH; and a transceiver module, configured to receive a random access preamble sent by the UE, and send the scheduling signaling of the random access response through the E-PDCCH according to the random access preamble, so that the UE receives, after sending the random access preamble, the scheduling signaling of the random access response through the E-PDCCH according to the random access response parameter.

With reference to the fourth aspect, in a first possible implementation manner of the fourth aspect, the eNB is a target eNB, and the first sending module is specifically configured to:

send a handover request acknowledge message to a source eNB, so that the source eNB sends a handover command to the UE after receiving the handover request acknowledge message, where both the handover command and the handover request acknowledge message include the random access response parameter; or send a handover request acknowledge to a target mobility management entity MME, so that the target MME sends a forward relocation response to a source MME after receiving the handover request acknowledge, the source MME sends a handover command to a source eNB after receiving the forward relocation response, and the source eNB sends a handover command to the UE after receiving the handover command sent by the source MME, where the handover command sent by the source eNB, the handover command sent by the source MME, the forward relocation response, and the handover request acknowledge all include the random access response parameter; or send a handover request acknowledge to an MME, so that the MME sends a handover command to a source eNB after receiving the handover request acknowledge, and the source eNB sends a handover command to the UE after receiving the handover command sent by the source MME, where the handover command sent by the source eNB, the handover command sent by the MME, and the handover request acknowledge all include the random access response parameter.

With reference to the fourth aspect, in a second possible implementation manner of the fourth aspect, the eNB is a serving base station of the UE, and the first sending module is specifically configured to:

send the random access response parameter to the UE, where the random access response parameter is included in any one of the following messages:

a radio resource control (RRC) message, a media access control (MAC) layer message, a physical layer message, and a system broadcast message.

With reference to the fourth aspect or the first or the second possible implementation manner of the fourth aspect, in a third possible implementation manner of the fourth aspect, the random access response parameter sent by the first sending module includes at least one of the following items:

indication information used to indicate whether the UE uses the E-PDCCH to receive the scheduling signaling of the RAR;

configuration information of an E-PDCCH;

configuration information of the E-PDCCH used to transmit the scheduling signaling of the RAR; and indication information used to indicate whether the UE uses a cell-radio network temporary identifier C-RNTI to receive the scheduling signaling of the RAR.

With reference to the fourth aspect or any one of the first to the third possible implementation manners of the fourth aspect, in a fourth possible implementation manner of the fourth aspect, the transceiver module is specifically configured to:

receive a first dedicated preamble sent by the UE, so that the eNB transmits, through the E-PDCCH, the scheduling signaling of the RAR after receiving the first dedicated preamble; or receive the random access preamble sent by the UE, where the random access preamble belongs to a first preamble set, so that the eNB transmits, through the E-PDCCH, the scheduling signaling of the RAR after receiving the random access preamble that belongs to the first preamble set.

With reference to the fourth aspect or any one of the first to the fourth possible implementation manners of the fourth aspect, in a fifth possible implementation manner of the fourth aspect, the device further includes:

a second sending module, configured to send grouping information to the UE, so that the UE performs processing according to the random access response parameter when the UE determines, according to the grouping information, that the UE belongs to a first group, where the UE included in the first group is UE that can receive the scheduling signaling of the RAR through the E-PDCCH, and the grouping information includes:

determining that UE that has an E-PDCCH capability and/or whose current status is a connected state belongs to the first group.

According to a fifth aspect, a terminal is provided, including a transmitter, a receiver, a memory, and a processor that is separately connected to the transmitter, the receiver, and the memory, where the memory stores a group of program code, and the processor is configured to invoke the program code stored in the memory and perform the step according to the first aspect.

According to a sixth aspect, a base station is provided, including a transmitter, a receiver, a memory, and a processor that is separately connected to the transmitter, the receiver, and the memory, where the memory stores a group of program code, and the processor is configured to invoke the program code stored in the memory and perform the step according to the second aspect.

According to a seventh aspect, a computer program product is provided, including a computer readable medium, where the computer readable medium includes a group of program code, which is used to perform the step according to the first aspect.

According to an eighth aspect, a computer program product is provided, including a computer readable medium, where the computer readable medium includes a group of program code, which is used to perform the step according to the second aspect.

In the foregoing technical solutions, scheduling signaling of an RAR is transmitted through an E-PDCCH. An E-PDCCH is located in an area, of a subframe, in which downlink data is transmitted, uses a frequency different from that of a PDSCH, and does not occupy an entire frequency band. Therefore, a problem caused by transmission of scheduling signaling of an RAR through a PDCCH located in an entire frequency band may be avoided, and impact of inter-cell interference on the scheduling signaling of the RAR may be reduced, thereby shortening a time delay of a random access process.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
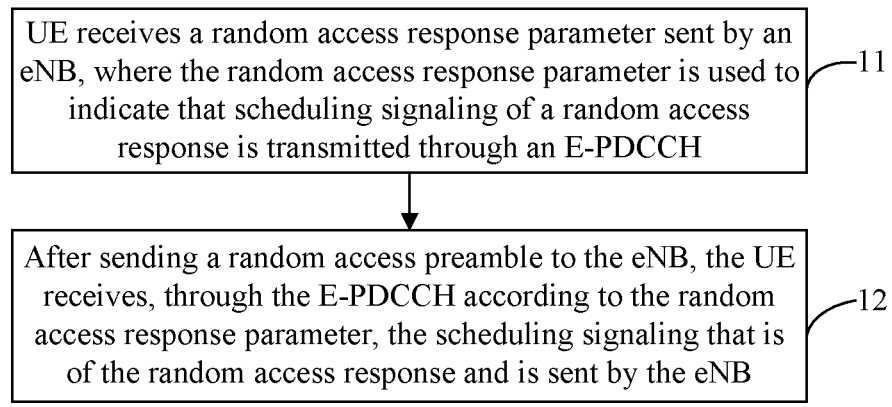
FIG. 1 is a schematic flowchart of an embodiment of a scheduling signaling transmission method according to the present invention.

FIG. 1 is a schematic flowchart of an embodiment of a scheduling signaling transmission method according to the present invention, and the method includes:

11. UE receives a random access response parameter sent by an eNB, where the random access response parameter is used to indicate that scheduling signaling of a random access response is transmitted through an E-PDCCH.

12. After sending a random access preamble to the eNB, the UE receives, through the E-PDCCH according to the random access response parameter, the scheduling signaling that is of the random access response and that is sent by the eNB.

In a handover scenario, the foregoing eNB is a target eNB. The UE receives a random access response parameter from the target eNB, where the random access response parameter may be sent to the UE by the target eNB through a source eNB; or the random access response parameter may be sent to a mobility management entity (MME) by the target eNB, and the MME further sends the random access response parameter to the UE through a source eNB; or the random access response parameter may be sent to a target MME by the target eNB, the target MME sends the random access response parameter to a source MME, and further the source MME sends the random access response parameter to the UE through a source eNB. In addition, in the handover scenario, the UE also sends a random access preamble to the target eNB, and receives scheduling signaling of a random access response from the target eNB, thereby completing random access in the target eNB.

Alternatively, the foregoing eNB may also be a serving eNB that provides a current service for the UE. The UE receives a random access response parameter from the serving eNB, sends a random access preamble to the serving eNB, and receives scheduling signaling of the random access response from the serving eNB, thereby completing random access in the serving eNB.

Figure 2:
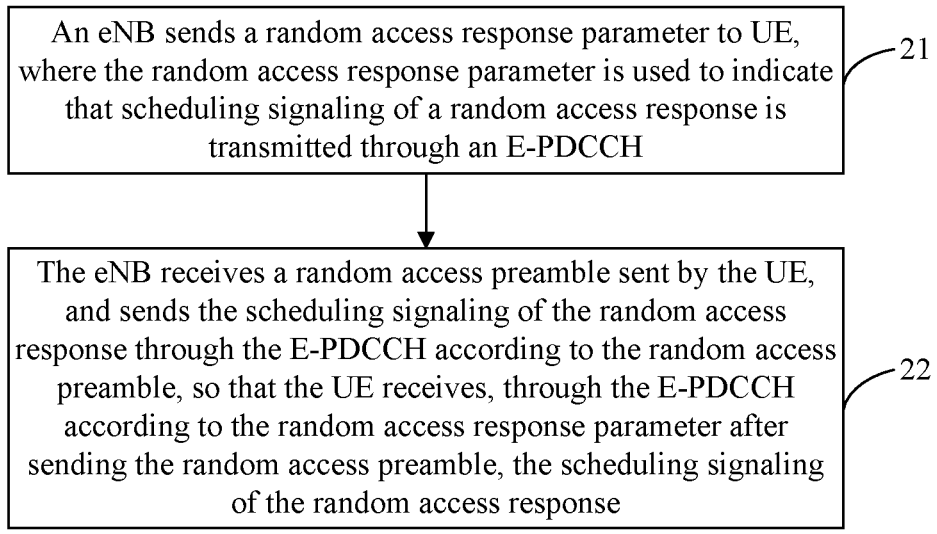
FIG. 2 is a schematic flowchart of another embodiment of a scheduling signaling transmission method according to the present invention.

Correspondingly, referring to FIG. 2, a process executed by an eNB includes:

21. The eNB sends a random access response parameter to UE, where the random access response parameter is used to indicate that scheduling signaling of a random access response is transmitted through an E-PDCCH.

22. The eNB receives a random access preamble sent by the UE, and sends the scheduling signaling of the random access response through the E-PDCCH according to the random access preamble, so that the UE receives, through the E-PDCCH according to the random access response parameter after sending the random access preamble, the scheduling signaling that is of the random access response and that is sent by the eNB.

In the prior art, a PDCCH is used to transmit scheduling signaling, where the scheduling signaling includes the scheduling signaling of the random access response. The PDCCH usually occupies the first one to three orthogonal frequency division multiplexing (OFDM) symbols that are of entire downlink system bandwidth and in each subframe, and a cell reference signal (CRS) is used to perform demodulation on the PDCCH.

Different from that in the prior art, in this embodiment of the present invention, the scheduling signaling of the RAR is transmitted through the enhanced PDCCH (E-PDCCH), so as to reduce interference. The E-PDCCH is introduced into LTE-A. Different from that the PDCCH occupies a control area of the first one to three OFDM symbols of a subframe, the E-PDCCH is located in an area, in which downlink data is transmitted, of the subframe, that is, a physical downlink shared channel (PDSCH) area. The E-PDCCH uses a frequency different from that of the PDSCH, and may occupy a physical resource block (PRB) different from that occupied by the PDSCH. Therefore, demodulation may be performed on the E-PDCCH based on a specific reference signal (DM-RS) of the UE.

When the scheduling signaling of the RAR is in the PDCCH, because channel quality of all UEs that need to receive the scheduling signaling of the RAR needs to be considered, a conservative modulation and coding scheme needs to be used, and more channel resources need to be occupied, which affects transmission efficiency.

In this embodiment of the present invention, because an E-PDCCH does not occupy an entire frequency band, when scheduling signaling of an RAR is transmitted through the E-PDCCH, interference from a neighboring cell can be reduced, and reliability of the scheduling signaling of the RAR can be improved, thereby shortening a time delay of a random access process. In addition, according to this embodiment of the present invention, the scheduling signaling of the RAR is transmitted through the E-PDCCH. Because the E-PDCCH is located in a PDSCH area, and demodulation may be performed on the E-PDCCH based on a specific reference signal of UE, that is, processing may be performed on the E-PDCCH with respect to specific UE. In this case, other UEs do not need to be considered, and corresponding processing is performed according to UE separately corresponding to the E-PDCCH. Therefore, a modulation and coding scheme of relatively high performance may be used for UE, thereby reducing an occupied channel resource and improving transmission efficiency.

Figure 3:
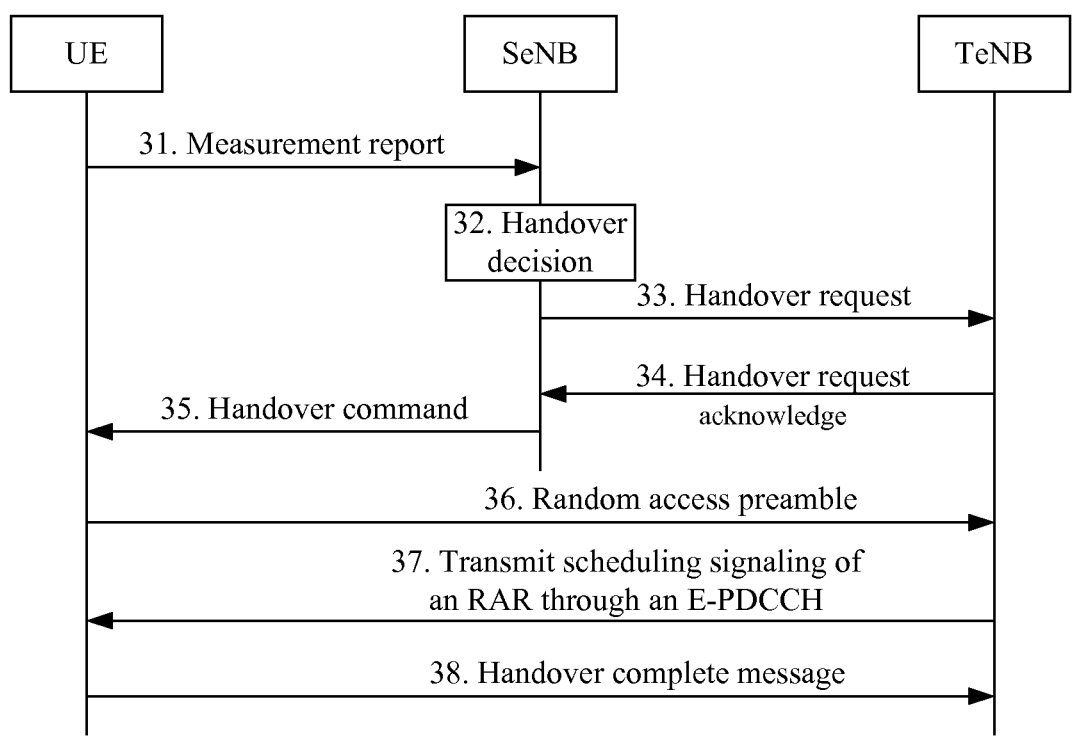
FIG. 3 is a schematic flowchart of another embodiment of a scheduling signaling transmission method according to the present invention.

FIG. 3 is a schematic flowchart of another embodiment of a scheduling signaling transmission method according to the present invention. This embodiment may be applied in a handover scenario, and that an X2 interface exists between a source eNB (SeNB) and a target eNB (TeNB) is used as an example. This embodiment includes:

31. UE sends a measurement report to the SeNB.
32. The SeNB makes a handover decision.

An example in which the SeNB makes a handover decision after the UE sends the measurement report to the SeNB is used in this embodiment.

Optionally, the SeNB may also actively make a handover decision. For example, current load of the SeNB is relatively heavy, and the UE needs to be handed over to the TeNB with relatively light load. Therefore, 31 is an optional step.

33. The SeNB sends a handover request (HANDOVER REQUEST) message to the TeNB.

For detailed content of 31-33, refer to an existing handover process.

34. The TeNB sends a handover request acknowledge (HANDOVER REQUEST ACKNOWLEDGE) message, where the handover request acknowledge message includes a random access response parameter.

The random access response parameter includes at least one of the following items:

indication information used to indicate whether an E-PDCCH is used to receive scheduling signaling of a random access response; or configuration information of an E-PDCCH, for example, information such as resources occupied by the E-PDCCH in a time domain and in a frequency domain, and a manner used by the E-PDCCH; or configuration information of an E-PDCCH used to transmit scheduling signaling of a random access response, for example, information such as resources occupied by and a manner used by the E-PDCCH, which transmits the scheduling signaling of the random access response, in the time domain and in the frequency domain; or indication information used to indicate that the UE uses a cell-radio network temporary identifier (C-RNTI) to receive scheduling signaling of an RAR.

35. The SeNB sends a handover command to the UE, where the handover command includes the random access response parameter.

36. The UE sends a random access preamble to the TeNB.

In a non-contention-based random access process, the random access preamble is a dedicated random access preamble configured for the UE by the TeNB.

Optionally, the dedicated random access preamble may be a first dedicated preamble configured for the UE by the TeNB, so that the TeNB uses the E-PDCCH to transmit the scheduling signaling of the RAR after receiving the first dedicated preamble. It may be understood that, the TeNB may further configure a second dedicated preamble, and the TeNB uses a PDCCH to transmit the scheduling signaling of the RAR after receiving the second dedicated preamble. That is, the TeNB may perform grouping on a dedicated random access preamble used by the UE, where a dedicated random access preamble in one group is referred to as a first dedicated preamble, and a dedicated random access preamble in the other group is referred to as a second dedicated preamble. The first dedicated preamble corresponds to an E-PDCCH, and the second dedicated preamble corresponds to a PDCCH. The so-call correspondence refers to that, when the TeNB needs to transmit scheduling signaling of an RAR of UE through the E-PDCCH, a dedicated random access preamble allocated to the UE by the TeNB is the first dedicated preamble, and then the TeNB may transmit the scheduling signaling of the RAR through the E-PDCCH after receiving the first dedicated preamble; when the TeNB needs to transmit scheduling signaling of an RAR of UE through the PDCCH, a dedicated random access preamble allocated to the UE by the TeNB is the second dedicated preamble, and then the TeNB may transmit the scheduling signaling of the RAR through the PDCCH after receiving the second dedicated preamble.

In a contention-based random access process, the random access preamble is a random access preamble selected by the UE from a preamble set available for the TeNB.

Optionally, the preamble set available for the TeNB may be a first preamble set configured for the UE by the TeNB, so that the TeNB transmits, through the E-PDCCH, the scheduling signaling of the RAR after receiving a random access preamble that belongs to the first preamble set. It may be understood that, the base station may further configure a second preamble set, and the TeNB transmits, through the PDCCH, the scheduling signaling of the RAR after receiving a random access preamble that belongs to the second preamble set. That is, the TeNB may perform grouping on a preamble set available for the TeNB, where one group is referred to as a first preamble set, and the other group is referred to as a second preamble set. The first preamble set corresponds to an E-PDCCH, and the second preamble set corresponds to a PDCCH. The so-called correspondence refers to that, when the TeNB needs to transmit scheduling signaling of an RAR of UE through the E-PDCCH, an available preamble set allocated to the UE by the TeNB is the first preamble set, and then the UE selects a random access preamble from the first preamble set and sends the random access preamble to the TeNB, and the TeNB may transmit the scheduling signaling of the RAR through the E-PDCCH after receiving the random access preamble and determining that the random access preamble belongs to the first preamble set; when the TeNB needs to transmit scheduling signaling of an RAR of UE through the PDCCH, an available preamble set allocated to the UE by the TeNB is the second preamble set, and then the UE selects a random access preamble from the second preamble set and sends the random access preamble to the TeNB, and the TeNB may transmit the scheduling signaling of the RAR through the PDCCH after receiving the random access preamble and determining that the random access preamble belongs to the second preamble set.

In addition, the UE may be notified, by using the handover request acknowledge message in 34 and the handover command in 35, of the dedicated random access preamble configured for the UE by the TeNB or the preamble set available for the TeNB.

Further, when the TeNB notifies the UE of the configured dedicated preamble or the available preamble set, a physical random access channel (PRACH) resource may be included in the handover request acknowledge message in 34 and the handover command in 35, so that the UE sends a corresponding preamble on the PRACH resource.

37. The TeNB transmits scheduling signaling of an RAR through an E-PDCCH.

It may be that, when the random access preamble sent by the UE and received by the TeNB is the dedicated random access preamble configured by the TeNB, it is determined that the scheduling signaling of the RAR is transmitted through the E-PDCCH; or when the random access preamble sent by the UE and received by the TeNB belongs to an available preamble set configured by the TeNB, it is determined that the scheduling signaling of the RAR is transmitted through the E-PDCCH.

Details may be as described above; in the non-contention-based random access process, when the random access preamble received by the TeNB is the first dedicated preamble, the TeNB transmits the scheduling signaling of the RAR through the E-PDCCH. It may be understood that, when the random access preamble received by the TeNB is the second dedicated preamble, the TeNB may transmit the scheduling signaling of the RAR through the PDCCH.

In the contention-based random access process, when the random access preamble received by the TeNB belongs to the first preamble set, the TeNB transmits the scheduling signaling of the RAR through the E-PDCCH. It may be understood that, when the random access preamble received by the TeNB belongs to the second preamble set, the TeNB may transmit the scheduling signaling of the RAR through the PDCCH.

It may be understood that, in the foregoing step, the TeNB may perform configuration, to transmit the scheduling signaling of the RAR through the PDCCH.

In addition, in the prior art, a random access radio network temporary identifier (RA-RNTI) is used to mask the scheduling signaling of the RAR. In this embodiment, the TeNB may use a C-RNTI or an RA-RNTI according to configurations to mask the scheduling signaling of the RAR.

38. The UE receives the scheduling signaling of the RAR through the E-PDCCH according to the handover command, further receives the RAR according to the scheduling signaling of the RAR, and then sends a handover complete message to the TeNB. In this case, the TeNB becomes a serving base station of the UE.

The UE may specifically receive the scheduling signaling of the RAR through the E-PDCCH according to the random access response parameter in the handover command. For example, when the parameter indicates that the scheduling signaling of the RAR is transmitted through the E-PDCCH, the UE receives the scheduling signaling of the RAR through the E-PDCCH.

Optionally, the UE may choose, according to configurations in the handover command, the C-RNTI or the RA-RNTI to unmask the scheduling signaling of the RAR. For example, when the random access response parameter in the handover command indicates that the UE uses the C-RNTI to receive the scheduling signaling of the RAR, the UE choose to use the C-RNTI to unmask the scheduling signaling of the RAR.

According to this embodiment, a target eNB sends a random access response parameter to UE, which may indicate that the UE uses an E-PDCCH to receive, in the target eNB, scheduling signaling of an RAR. Because the scheduling signaling of the RAR is transmitted through the E-PDCCH, interference may be reduced, a time delay of a random access process may be shortened, and an occupied channel resource may be reduced, thereby improving transmission efficiency. This embodiment may be applied in a scenario in which an X2 interface exists between two base stations when a handover is performed. In addition, the target eNB performs grouping on a dedicated preamble or an available preamble set configured for the UE, and may transmit the scheduling signaling of the RAR through the E-PDCCH or a PDCCH according to a set to which a random access preamble sent by the UE belongs, which implements control on the UE more flexibly.

In this embodiment, several concepts need to be noted. A serving eNB refers to a base station that currently provides a service for UE. A source eNB and a target eNB refer to that, in a handover scenario, a serving eNB of UE is switched from a source eNB to a target eNB, that is, before a handover, the source eNB is the serving eNB of the UE, and after a successful handover, the target eNB becomes a new serving eNB of the UE. It is the same in the following embodiments, and details are not described herein again.

Figure 4:
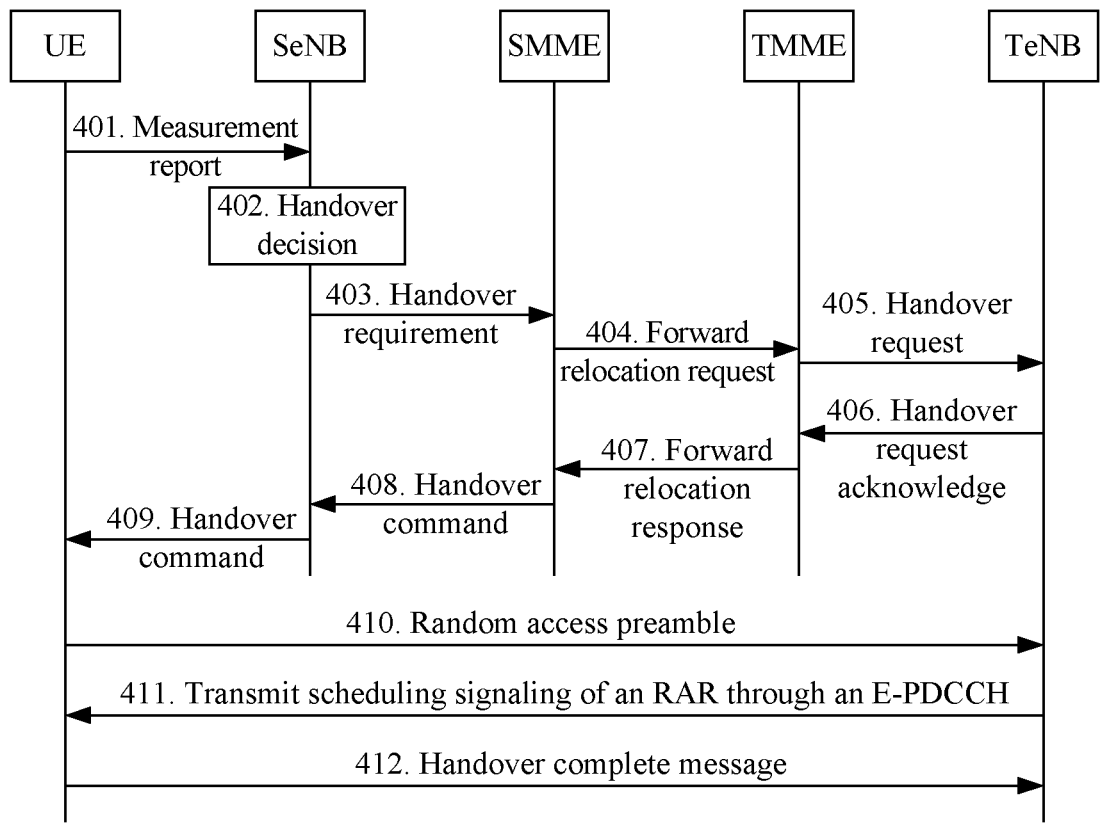
FIG. 4 is a schematic flowchart of another embodiment of a scheduling signaling transmission method according to the present invention.

FIG. 4 is a schematic flowchart of another embodiment of a scheduling signaling transmission method according to the present invention. This embodiment may be applied in a handover scenario, and that a message needs to be transmitted between a source eNB (SeNB) and a target eNB (TeNB) through an S1 interface, that is, an interface between an eNB and a mobility management entity (MME) is used as an example. This embodiment includes:

401. UE sends a measurement report to the SeNB.

402. The SeNB makes a handover decision.

An example in which the SeNB makes a handover decision after the UE sends the measurement report to the SeNB is used in this embodiment.

Optionally, the SeNB may also actively make a handover decision. For example, current load of the SeNB is relatively heavy, and the UE needs to be handed over to the TeNB with relatively light load. Therefore, 401 is an optional step.

403. The SeNB sends a handover request (HANDOVER REQUEST) message to a source MME (SMME).

404. The SMME sends a forward relocation request (forward relocation request) message to a target MME (TMME).

405. The TMME sends a handover request (HANDOVER REQUEST) message to the TeNB.

For detailed content of 401-405, refer to an existing handover process.

406. The TeNB sends a handover request acknowledge (HANDOVER REQUEST ACKNOWLEDGE) message, where the handover request acknowledge message includes a random access response parameter.

For detailed content of the random access response parameter, refer to 34.

407. The TMME sends a forward relocation response message, where the forward relocation response message includes the random access response parameter.

408. The SMME sends a handover command to the SeNB, where the handover command includes the random access response parameter.

409. The SeNB sends a handover command to the UE, where the handover command includes the random access response parameter.

410. The UE sends a random access preamble to the TeNB.

In a non-contention-based random access process, the random access preamble is a dedicated random access preamble configured for the UE by the TeNB.

Optionally, the dedicated random access preamble may be a first dedicated preamble configured for the UE by the TeNB, so that the TeNB uses an E-PDCCH to transmit scheduling signaling of an RAR after receiving the first dedicated preamble. It may be understood that, the base station may further configure a second dedicated preamble, and the TeNB uses a PDCCH to transmit the scheduling signaling of the RAR after receiving the second dedicated preamble. That is, the TeNB may perform grouping on a dedicated random access preamble used by the UE, where a dedicated random access preamble in one group is referred to as a first dedicated preamble, and a dedicated random access preamble in the other group is referred to as a second dedicated preamble. The first dedicated preamble corresponds to an E-PDCCH, and the second dedicated preamble corresponds to a PDCCH. The so-call correspondence refers to that, when the TeNB needs to transmit scheduling signaling of an RAR of UE through the E-PDCCH, a dedicated random access preamble allocated to the UE by the TeNB is the first dedicated preamble, and then the TeNB may transmit the scheduling signaling of the RAR through the E-PDCCH after receiving the first dedicated preamble; when the TeNB needs to transmit scheduling signaling of an RAR of UE through the PDCCH, a dedicated random access preamble allocated to the UE by the TeNB is the second dedicated preamble, and then the TeNB may transmit the scheduling signaling of the RAR through the PDCCH after receiving the second dedicated preamble.

In a contention-based random access process, the random access preamble is a random access preamble selected by the UE from a preamble set available for the TeNB.

Optionally, the preamble set available for the TeNB may be a first preamble set configured for the UE by the TeNB, so that the TeNB transmits, through the E-PDCCH, the scheduling signaling of the RAR after receiving a random access preamble that belongs to the first preamble set. It may be understood that, the base station may further configure a second preamble set, and the TeNB transmits, through the PDCCH, the scheduling signaling of the RAR after receiving a random access preamble that belongs to the second preamble set. That is, the TeNB may perform grouping on a preamble set available for the TeNB, where one group is referred to as a first preamble set, and the other group is referred to as a second preamble set. The first preamble set corresponds to an E-PDCCH, and the second preamble set corresponds to a PDCCH. The so-called correspondence refers to that, when the TeNB needs to transmit scheduling signaling of an RAR of UE through the E-PDCCH, an available preamble set allocated to the UE by the TeNB is the first preamble set, and then the UE selects a random access preamble from the first preamble set and sends the random access preamble to the TeNB, and the TeNB may transmit the scheduling signaling of the RAR through the E-PDCCH after receiving the random access preamble and determining that the random access preamble belongs to the first preamble set; when the TeNB needs to transmit scheduling signaling of an RAR of UE through the PDCCH, an available preamble set allocated to the UE by the TeNB is the second preamble set, and then the UE selects a random access preamble from the second preamble set and sends the random access preamble to the TeNB, and the TeNB may transmit the scheduling signaling of the RAR through the E-PDCCH after receiving the random access preamble and determining that the random access preamble belongs to the second preamble set.

In addition, the UE may be notified, by using the messages in 406-409, of the dedicated random access preamble configured for the UE by the TeNB or the preamble set available for the TeNB, together with the random access response parameter.

Further, when notifying the UE of the dedicated preamble or the available preamble set, the TeNB may also transmit a PRACH resource by using the messages in 406-409, so that the UE sends a corresponding preamble on the PRACH resource.

411. The TeNB transmits scheduling signaling of an RAR through an E-PDCCH.

It may be that, when the random access preamble sent by the UE and received by the TeNB is the dedicated random access preamble configured by the TeNB, it is determined that the scheduling signaling of the RAR is transmitted through the E-PDCCH; or when the random access preamble sent by the UE and received by the TeNB belongs to an available preamble set configured by the TeNB, it is determined that the scheduling signaling of the RAR is transmitted through the E-PDCCH.

Details may be as described above; in the non-contention-based random access process, when the random access preamble received by the TeNB is the first dedicated preamble, the TeNB transmits the scheduling signaling of the RAR through the E-PDCCH. It may be understood that, when the random access preamble received by the TeNB is the second dedicated preamble, the TeNB may transmit the scheduling signaling of the RAR through the PDCCH.

In the contention-based random access process, when the random access preamble received by the TeNB belongs to the first preamble set, the TeNB transmits the scheduling signaling of the RAR through the E-PDCCH. It may be understood that, when the random access preamble received by the TeNB belongs to the second preamble set, the TeNB may transmit the scheduling signaling of the RAR through the PDCCH.

It may be understood that, in the foregoing step, the TeNB may perform configuration, to transmit the scheduling signaling of the RAR through the PDCCH.

In addition, optionally, the TeNB may use a C-RNTI or an RA-RNTI according to configurations to mask the scheduling signaling of the RAR.

412. The UE receives the scheduling signaling of the RAR through the E-PDCCH according to the handover command, further receives the RAR according to the scheduling signaling of the RAR, and then sends a handover complete message to the TeNB. In this case, the TeNB becomes a serving base station of the UE.

Optionally, the UE may choose, according to configurations in the handover command, the C-RNTI or the RA-RNTI to unmask the scheduling signaling of the RAR.

That a handover occurs on an MME is used as an example in this embodiment. It may also be that an SMME and a TMME are a same MME; and in this case, the forward relocation request message and the forward relocation response message between the two MMEs in the foregoing steps may be ignored.

According to this embodiment, a target eNB sends a random access response parameter to UE, which may indicate that the UE uses an E-PDCCH to receive, in the target eNB, scheduling signaling of an RAR. Because the scheduling signaling of the RAR is transmitted through the E-PDCCH, interference may be reduced, a time delay of a random access process may be shortened, and an occupied channel resource may be reduced, thereby improving transmission efficiency. This embodiment may be applied in a scenario in which a message is transmitted through an S1 when a handover is performed. In addition, the target eNB performs grouping on a dedicated preamble or an available preamble set configured for the UE, and may transmit the scheduling signaling of the RAR through the E-PDCCH or a PDCCH according to a set to which a random access preamble sent by the UE belongs, which implements control on the UE more flexibly.

Figure 5:
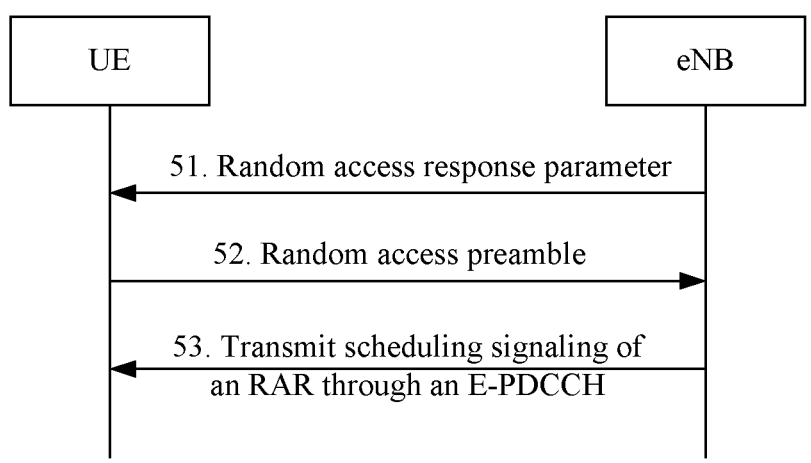
FIG. 5 is a schematic flowchart of another embodiment of a scheduling signaling transmission method according to the present invention.

FIG. 5 is a schematic flowchart of another embodiment of a scheduling signaling transmission method according to the present invention, and an example in which a serving base station of UE sends a random access response parameter to the UE is used in this embodiment. This embodiment includes:

51. An eNB sends a random access response parameter to the UE.

The eNB may be the serving base station of the UE.

The random access response parameter may be included in a dedicated configuration message for configuring a parameter for the UE, or may be included in a system broadcast message for notifying all UEs served by the base station. The dedicated configuration message may be an RRC message, a MAC layer message, a physical layer message, or the like.

In addition, for detailed content of the random access response parameter, refer to 34. That is, the random access response parameter may include at least one of the following items:

indication information used to indicate whether an E-PDCCH is used to receive scheduling signaling of a random access response; or configuration information of an E-PDCCH, for example, information such as resources occupied by the E-PDCCH in a time domain and in a frequency domain, and a manner used by the E-PDCCH; or configuration information of an E-PDCCH used to transmit scheduling signaling of a random access response, for example, information such as resources occupied by the E-PDCCH and a manner used by the E-PDCCH, which transmits the scheduling signaling of the random access response, in the time domain and in the frequency domain; or indication information used to indicate that the UE uses a cell-radio network temporary identifier (C-RNTI) to receive scheduling signaling of an RAR.

52. The UE sends a random access preamble to the eNB.

Similar to the foregoing embodiments, in a non-contention-based random access process, the random access preamble is a dedicated random access preamble configured for the UE by the eNB. In a contention-based random access process, the random access preamble is a random access preamble selected by the UE from an available preamble set configured by the eNB.

Optionally, similar to the foregoing embodiments, the dedicated random access preamble or the available preamble set may be configured by the eNB and corresponds to the E-PDCCH. That is, optionally, the dedicated random access preamble may be a first dedicated preamble configured for the UE by the eNB, so that the TeNB uses the E-PDCCH to transmit the scheduling signaling of the RAR after receiving the first dedicated preamble.

Optionally, the available preamble set may be a first preamble set configured for the UE by the TeNB, so that the TeNB transmits, through the E-PDCCH, the scheduling signaling of the RAR after receiving a random access preamble that belongs to the first preamble set. For detailed description, refer to the previous embodiment.

Optionally, the eNB may notify, by using a random access command, the UE of the dedicated random access preamble configured for the UE or a corresponding preamble set, configured by the eNB, for using the E-PDCCH to transmit the scheduling signaling of the RAR, where the random access command may be in a same message or may be in a different message with the random access response parameter in 51. In addition, the random access command may be transmitted through the E-PDCCH, or may be transmitted through a PDCCH.

In addition, the random access command may further include a physical random access channel (PRACH) resource, and then the UE transmits a random access preamble to the eNB on the PRACH resource.

53. The eNB transmits scheduling signaling of an RAR through an E-PDCCH.

Optionally, in the non-contention-based random access process, when the random access preamble received by the TeNB is a first dedicated preamble, the TeNB transmits the scheduling signaling of the RAR through the E-PDCCH.

Optionally, in the contention-based random access process, when the random access preamble received by the TeNB belongs to the first preamble set, the TeNB transmits the scheduling signaling of the RAR through the E-PDCCH.

Optionally, the eNB may use a C-RNTI or an RA-RNTI according to configurations to mask the scheduling signaling of the RAR.

Then, the UE receives the scheduling signaling of the RAR through the E-PDCCH according to the random access response parameter, and further receives the RAR according to the scheduling signaling, so as to complete random access.

Optionally, the UE may also use the C-RNTI or the RA-RNTI according to information in the random access response parameter to unmask the scheduling signaling of the RAR.

It may be understood that, the eNB may perform configuration, to transmit the scheduling signaling of the RAR through the PDCCH. For example, in the non-contention-based random access process, the eNB sends a second dedicated preamble to the UE, and then the eNB transmits, through the PDCCH, the scheduling signaling of the RAR after receiving the second dedicated preamble. Alternatively, in the contention-based random access process, the eNB sends a second preamble set to the UE, and then the UE selects a random access preamble from the second preamble set and sends the random access preamble to the eNB, and the eNB transmits, through the PDCCH, the scheduling signaling of the RAR after receiving the random access preamble belonging to the second preamble set. This embodiment may be applied in a non-handover scenario, for example, a scenario in which downlink data arrives but uplink is out-of-synchronization, uplink data arrives but uplink is out-of-synchronization, locating is performed, or the like. In these scenarios, a random access process needs to be first performed. The random access process includes a step of sending an RAR to UE by an eNB, and the RAR may be received according to scheduling signaling of the RAR. In this embodiment, the scheduling signaling of the RAR is transmitted through an E-PDCCH. Compared with transmission through a PDCCH, transmission through the E-PDCCH reduces interference, shortens a time delay of random access, and reduces an occupied channel resource, thereby improving transmission efficiency. In addition, the eNB performs grouping on a dedicated preamble or an available preamble set configured for the UE, and may transmit the scheduling signaling of the RAR through the E-PDCCH or the PDCCH according to a set to which the random access preamble sent by the UE belongs, which implements control on the UE more flexibly.

Figure 6:
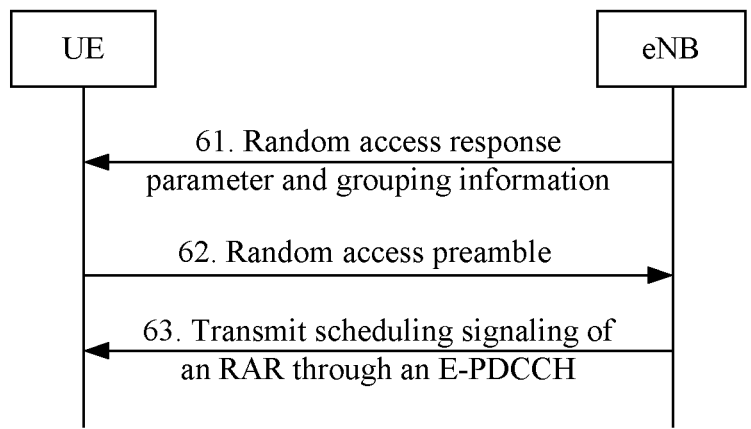
FIG. 6 is a schematic flowchart of another embodiment of a scheduling signaling transmission method according to the present invention.

FIG. 6 is a schematic flowchart of another embodiment of a scheduling signaling transmission method according to the present invention. Different from the foregoing embodiments, in this embodiment, grouping may be performed on UE. Scheduling signaling of RARs of one part of UEs is transmitted through an E-PDCCH, and scheduling signaling of RARs of the other part of UEs is transmitted through a PDCCH. This embodiment includes:

61. An eNB sends grouping information and a random access response parameter to UE.

The eNB may be a TeNB in a handover scenario, and the TeNB may send the grouping information and the random access response parameter to the UE through the X2 interface and the messages that are shown in FIG. 3, or the TeNB may send the grouping information and the random access response parameter to the UE through the S1 interface and the messages that are shown in FIG. 4; or the eNB may also be a serving base station of the UE, and the serving base station sends the grouping information and random access response parameter information to the UE by using an RRC message, a MAC layer message, a physical layer message, or a system broadcast message.

The grouping information shows a grouping rule, which is used for the UE to learn whether the UE itself can use the E-PDCCH to receive scheduling signaling of the RAR. Grouping may be performed according to a capability of the UE and/or a current status of the UE. The grouping rule may be that grouping is performed according to the capability of the UE. For example, the grouping rule may include that when the UE has an E-PDCCH capability, the UE can use the E-PDCCH to receive the scheduling signaling of the RAR. In this case, after receiving the grouping information, the UE may determine whether the UE has the E-PDCCH capability, and when the UE has the E-PDCCH capability, the UE may learn that the UE can use the E-PDCCH to receive the scheduling signaling of the RAR.

Alternatively, the grouping rule may also be that grouping is performed according to the current status of the UE. For example, the grouping rule may include that when the current status of the UE is a connected state, the UE can use the E-PDCCH to receive the scheduling signaling of the RAR. In this case, after receiving the grouping information, the UE may determine whether the current status of the UE is the connected state, and when the current status is the connected state, the UE may learn that the UE can use the E-PDCCH to receive the scheduling signaling of the RAR.

Alternatively, the grouping rule may also be that grouping is performed according to the capability and the current status that are of the UE. For example, the grouping rule may include that when the UE has the E-PDCCH capability and the current status is the connected state, the UE can use the E-PDCCH to receive the scheduling signaling of the RAR. In this case, after receiving the grouping information, the UE may determine whether the UE has the E-PDCCH capability and the current status is the connected state, and when the UE has the E-PDCCH capability and the current status is the connected state, the UE may learn that the UE can use the E-PDCCH to receive the scheduling signaling of the RAR.

That is, after receiving the grouping information, the UE performs processing according to the random access response parameter when determining, according to the grouping information, that the UE belongs to a first group, where the UE included in the first group is UE that can receive scheduling information of the RAR through the E-PDCCH, and the grouping information includes:

determining that UE that has the E-PDCCH capability belongs to the first group; and/or determining that UE whose current status is the connected state belongs to the first group.

For example, when the grouping information includes: determining that UE that has the E-PDCCH capability belongs to the first group, then after receiving the grouping information, the UE may determine that the UE belongs to the first group if the UE has the E-PDCCH capability; or when the grouping information includes: determining that UE whose current status is the connected state belongs to the first group, then after receiving the grouping information, the UE may determine that the UE belongs to the first group if the current status of the UE is the connected state; or when the grouping information includes: determining that UE that has the E-PDCCH capability and whose current status is the connected state belongs to the first group, then after receiving the grouping information, the UE may determine that the UE belongs to the first group if the UE has the E-PDCCH capability and whose current status is the connected state.

Further, when the grouping information includes: determining that UE that has the E-PDCCH capability belongs to the first group, the grouping information further includes a first dedicated preamble or a first preamble set that can be used by the UE that has the E-PDCCH capability, where the first dedicated preamble enables a base station to transmit, through the E-PDCCH, the scheduling signaling of the RAR after receiving the first dedicated preamble, and the first preamble set enables a base station to transmit, through the E-PDCCH, the scheduling signaling of the RAR after receiving a random access preamble that belongs to the first preamble set; or when the grouping information includes: determining that UE whose current status is the connected state belongs to the first group, the grouping information further includes a first dedicated preamble or a first preamble set that can be used by the UE whose current status is the connected state, where the first dedicated preamble enables a base station to transmit, through the E-PDCCH, the scheduling signaling of the RAR after receiving the first dedicated preamble, and the first preamble set enables a base station to transmit, through the E-PDCCH, the scheduling signaling of the RAR after receiving a random access preamble that belongs to the first preamble set; or when the grouping information includes: determining that UE that has the E-PDCCH capability and whose current status is the connected state belongs to the first group, the grouping information further includes a first dedicated preamble or a first preamble set that can be used by the UE that has the E-PDCCH capability and whose current status is the connected state, where the first dedicated preamble enables a base station to transmit, through the E-PDCCH, the scheduling signaling of the RAR after receiving the first dedicated preamble, and the first preamble set enables a base station to transmit, through the E-PDCCH, the scheduling signaling of the RAR after receiving a random access preamble parameter belonging to the first preamble set.

Optionally, the grouping information and the random access response parameter may be transmitted in a same message, or may be transmitted in different messages.

Optionally both the grouping information and the random access response parameter may be sent to the UE by using any one of the following messages: an RRC message, a MAC layer message, a physical layer message, and a system broadcast message.

62. The UE sends a random access preamble to the eNB.

As shown in the foregoing embodiments, a dedicated random access preamble of the UE or an available preamble set configured by the eNB may be carried in a handover command and a corresponding response message that are in a handover scenario, or in a random access command sent by a serving base station.

Optionally, for UE that can use the E-PDCCH to receive the scheduling signaling of the RAR, the dedicated random access preamble may be the foregoing first dedicated preamble, and the available preamble set may specifically be the foregoing first preamble set; or for UE that cannot use the E-PDCCH to receive the scheduling signaling of the RAR, the dedicated random access preamble may be the foregoing second dedicated preamble, and the available preamble set may specifically be the foregoing second preamble set.

63. After receiving the random access preamble sent by the UE, the eNB chooses, according to configurations, to transmit scheduling signaling of an RAR through a PDCCH or an E-PDCCH. An example in which the scheduling signaling of the RAR is transmitted through the E-PDCCH is used in FIG. 6.

Different available preamble sets are configured for UEs in different groups, and the UEs in the different groups choose a preamble from the different preamble sets. A base station can determine, according to a set to which the preamble belongs, whether the UE needs to use the E-PDCCH to receive the scheduling signaling of the RAR, and then the base station may send the scheduling signaling of the RAR through or not through the E-PDCCH.

Specifically, it may be that in a non-contention-based random access process, when a random access preamble sent by first UE and received by the eNB is the first dedicated preamble, the eNB transmits scheduling signaling of an RAR of the first UE through the E-PDCCH. When a random access preamble sent by second UE and received by the eNB is the second dedicated preamble, the eNB transmits scheduling signaling of an RAR of the second UE through the PDCCH.

In a contention-based random access process, when the random access preamble sent by the first UE and received by the eNB belongs to the first preamble set, the eNB transmits the scheduling signaling of the RAR of the first UE through the E-PDCCH. When the random access preamble sent by the second UE and received by the eNB belongs to the second preamble set, the eNB transmits the scheduling signaling of the RAR of the second through the PDCCH.

Optionally, the eNB may use a C-RNTI or an RA-RNTI according to configurations to mask the scheduling signaling of the RAR.

Then, the UE may receive the scheduling signaling of the RAR through the E-PDCCH according to the random access response parameter, and further receives the RAR according to the scheduling signaling, so as to complete random access.

Optionally, the UE may also use the C-RNTI or the RA-RNTI according to information in the random access response parameter to unmask the scheduling signaling of the RAR.

In this embodiment, by grouping, scheduling signaling of RARs of one part of UEs may be transmitted through a PDCCH, and scheduling signaling of RARs of the other part of UEs may be transmitted through an E-PDCCH, thereby meeting requirements of different scenarios. An eNB sends grouping information, and UE itself determines a group to which the UE belongs; therefore, the eNB may transmit scheduling signaling of an RAR separately through the E-PDCCH and the PDCCH in a scenario in which the eNB does not learn a UE capability, thereby improving flexibility. By performing grouping on a dedicated preamble or an available preamble set configured for the UE, the eNB may transmit the scheduling signaling of the RAR through the E-PDCCH or the PDCCH according to a set to which a random access preamble sent by the UE belongs, which implements control on the UE more flexibly.

Figure 7:
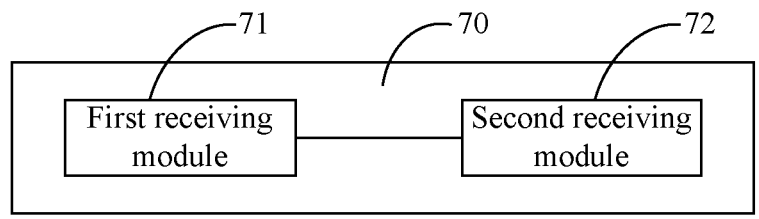
FIG. 7 is a schematic structural diagram of an embodiment of a scheduling signaling transmission device according to the present invention.

FIG. 7 is a schematic structural diagram of an embodiment of a scheduling signaling transmission device according to the present invention, where the device 70 includes a first receiving module 71 and a second receiving module 72. The first receiving module 71 is configured to receive a random access response parameter sent by an eNB, where the random access response parameter is used to indicate that scheduling signaling of a random access response is transmitted through an E-PDCCH. The second receiving module 72 is configured to, after sending a random access preamble, receive, through the E-PDCCH according to the random access response parameter, the scheduling signaling that is of the random access response and that is sent by the eNB.

Optionally, the first receiving module includes:

a first receiving unit, configured to receive a random access response parameter sent by a target eNB; or a second receiving unit, configured to receive a random access response parameter sent by a serving eNB.

Optionally, the first receiving unit is specifically configured to:

receive a handover command sent by a source eNB, where: the handover command is sent by the source eNB after receiving a handover request acknowledge message sent by the target eNB; both the handover command and the handover request acknowledge message include the random access response parameter; or receive a handover command sent by a source eNB, where: the handover command is sent by the source eNB after receiving a handover command sent by a source MME; the handover command sent by the source MME is sent by the source MME after receiving a forward relocation response sent by a target MME; the forward relocation response is sent by the target MME after receiving a handover request acknowledge sent by the target eNB; the handover command sent by the source eNB, the handover command sent by the source MME, the forward relocation response, and the handover request acknowledge all include the random access response parameter; or receive a handover command sent by a source eNB, where: the handover command is sent by the source eNB after receiving a handover command sent by an MME; the handover command sent by the MME is sent by the MME after receiving a handover request acknowledge sent by the target eNB; the handover command sent by the source eNB, the handover command sent by the MME, and the handover request acknowledge all include the random access response parameter.

Optionally, the second receiving unit is specifically configured to:

receive any one of the following messages that include the random access response parameter and are sent by the serving eNB:

an RRC message, a MAC layer message, a physical layer message, and a system broadcast message.

Optionally, the random access response parameter received by the first receiving module includes at least one of the following items:

indication information used to indicate whether UE uses the E-PDCCH to receive the scheduling signaling of the RAR;

configuration information of an E-PDCCH;

configuration information of the E-PDCCH used to transmit the scheduling signaling of the RAR; and indication information used to indicate whether the UE uses a C-RNTI to receive the scheduling signaling of the RAR.

Optionally, the second receiving module is specifically configured to:

send a first dedicated preamble to the eNB, so that the eNB transmits, through the E-PDCCH, the scheduling signaling of the RAR after receiving the first dedicated preamble; or send the random access preamble to the eNB, where the random access preamble belongs to a first preamble set, so that the eNB transmits, through the E-PDCCH, the scheduling signaling of the RAR after receiving the random access preamble that belongs to the first preamble set.

Optionally, the device further includes:

a third receiving module, configured to receive grouping information, so that the UE performs processing according to the random access response parameter when determining, according to the grouping information, that the UE belongs to a first group, where the UE included in the first group is UE that can receive the scheduling signaling of the RAR through the E-PDCCH, and the grouping information includes:

determining that UE that has an E-PDCCH capability and/or whose current status is a connected state belongs to the first group.

Optionally, when the grouping information includes determining that the UE that has the E-PDCCH capability belongs to the first group, the grouping information further includes a first dedicated preamble or a first preamble set used by the UE that has the E-PDCCH capability; or when the grouping information includes determining that the UE whose current status is the connected state belongs to the first group, the grouping information further includes a first dedicated preamble or a first preamble set that can be used by the UE whose current status is the connected state; or when the grouping information includes determining that the UE that has the E-PDCCH capability and whose current status is the connected state belongs to the first group, the grouping information further includes a first dedicated preamble or a first preamble set used by the UE that has the E-PDCCH capability and whose current status is the connected state.

Optionally, the grouping information and the random access response parameter are transmitted in a same message or transmitted in different messages, and both the grouping information and the random access response parameter may be sent to the UE by using any one of the following messages: an RRC message, a MAC layer message, a physical layer message, and a system broadcast message.

In hardware implementation, the foregoing first receiving module, second receiving module, first receiving unit, second receiving unit, and third receiving module may be a receiver or a transceiver.

Figure 8:
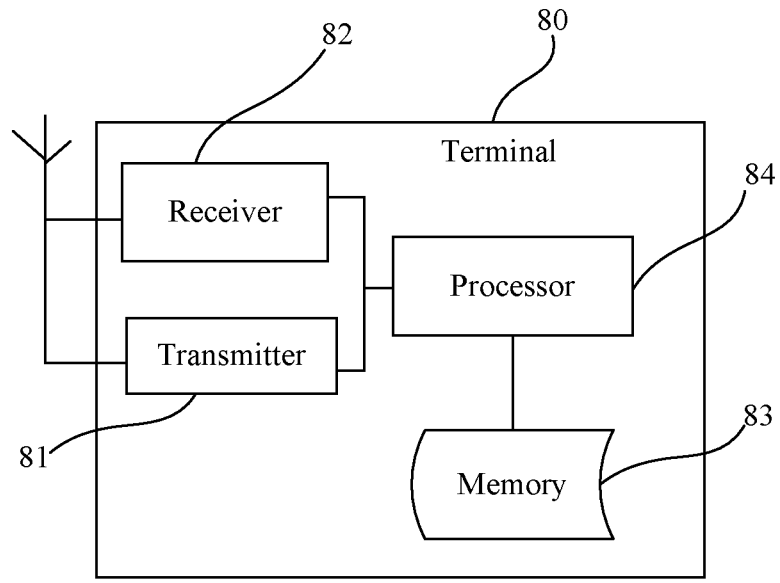
FIG. 8 is a schematic structural diagram of another embodiment of a scheduling signaling transmission device according to the present invention.

Referring to FIG. 8, FIG. 8 is a schematic structural diagram of another device according to an embodiment of the present invention, where the device may specifically be a terminal. As shown in the figure, the terminal 80 includes a transmitter 81, a receiver 82, a memory 83, and a processor 84 that is separately connected to the transmitter 81, the receiver 82, and the memory 83. Certainly, the terminal may further include general components, such as an antenna, a baseband processing component, an intermediate radio frequency processing component, and an input and output apparatus, which are not limited herein in this embodiment of the present invention.

The memory stores a group of program code, and the processor 84 is configured to invoke the program code stored in the memory, so as to perform the following operations:

receiving, by using the receiver, a random access response parameter sent by an eNB, where the random access response parameter is used to indicate that scheduling signaling of a random access response is transmitted through an E-PDCCH; and after sending a random access preamble to the eNB by using the transmitter, receiving, through the E-PDCCH according to the random access response parameter by using the receiver, the scheduling signaling of the random access response.

It should be noted that, terminals shown in FIG. 7 and FIG. 8 may be configured to implement any method provided in the foregoing method embodiments. Description related to detailed content of the random access response parameter, a specific transmission manner, and the like is the same as that in the foregoing method embodiments, and details are not described herein again.

In this embodiment, by transmitting scheduling signaling of an RAR through an E-PDCCH, interference from a neighboring cell can be reduced, and reliability of the scheduling signaling of the RAR can be improved, thereby shortening a time delay of a random access process. In addition, by transmitting the scheduling signaling of the RAR through the E-PDCCH, a modulation and coding scheme of relatively high performance may be used for UE, thereby reducing an occupied channel resource and improving transmission efficiency.

Figure 9:
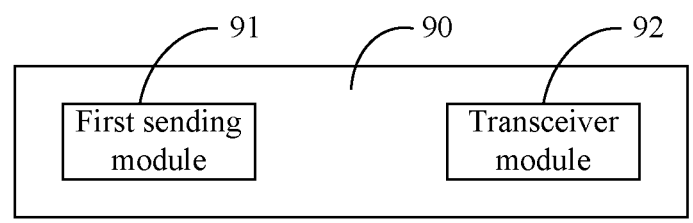
FIG. 9 is a schematic structural diagram of another embodiment of a scheduling signaling transmission device according to the present invention.

FIG. 9 is a schematic structural diagram of another embodiment of a scheduling signaling transmission device according to the present invention, where the device 90 includes a first sending module 91 and a transceiver module 92. The first sending module 91 is configured to send a random access response parameter to UE, where the random access response parameter is used to indicate that scheduling signaling of a random access response is transmitted through an E-PDCCH. The transceiver module 92 is configured to receive a random access preamble sent by the UE, and send the scheduling signaling of the random access response through the E-PDCCH according to the random access preamble, so that the UE receives, after sending the random access preamble, the scheduling signaling of the random access response through the E-PDCCH according to the random access response parameter.

Optionally, the eNB is a target eNB, and the first sending module is specifically configured to:

send a handover request acknowledge message to a source eNB, so that the source eNB sends a handover command to the UE after receiving the handover request acknowledge message, where both the handover command and the handover request acknowledge message include the random access response parameter; or send a handover request acknowledge to a target MME, so that the target MME sends a forward relocation response to a source MME after receiving the handover request acknowledge, the source MME sends a handover command to a source eNB after receiving the forward relocation response, and the source eNB sends a handover command to the UE after receiving the handover command sent by the source MME, where the handover command sent by the source eNB, the handover command sent by the source MME, the forward relocation response, and the handover request acknowledge all include the random access response parameter; or send a handover request acknowledge to an MME, so that the MME sends a handover command to a source eNB after receiving the handover request acknowledge, and the source eNB sends a handover command to the UE after receiving the handover command sent by the source MME, where the handover command sent by the source eNB, the handover command sent by the MME, and the handover request acknowledge all include the random access response parameter.

Optionally, the eNB is a serving eNB of the UE, and the first sending module is specifically configured to:

send the random access response parameter to the UE, where the random access response parameter is included in any one of the following messages:

an RRC message, a MAC layer message, a physical layer message, and a system broadcast message.

Optionally, the random access response parameter sent by the first sending module includes at least one of the following items:

indication information used to indicate whether the UE uses the E-PDCCH to receive the scheduling signaling of the RAR;

configuration information of an E-PDCCH;

configuration information of the E-PDCCH used to transmit the scheduling signaling of the RAR; and indication information used to indicate whether the UE uses a C-RNTI to receive the scheduling signaling of the RAR.

Optionally, the transceiver module is specifically configured to:

receive a first dedicated preamble sent by the UE, so that the eNB transmits, through the E-PDCCH, the scheduling signaling of the RAR after receiving the first dedicated preamble; or receive the random access preamble sent by the UE, where the random access preamble belongs to a first preamble set, so that the eNB transmits, through the E-PDCCH, the scheduling signaling of the RAR after receiving the random access preamble that belongs to the first preamble set.

Optionally, the device further includes:

a second sending module, configured to send grouping information to the UE, so that the UE performs processing according to the random access response parameter when the UE determines, according to the grouping information, that the UE belongs to a first group, where the UE included in the first group is UE that can receive the scheduling signaling of the RAR through the E-PDCCH, and the grouping information includes:

determining that UE that has an E-PDCCH capability and/or whose current status is a connected state belongs to the first group.

Optionally, when the grouping information includes determining that the UE that has the E-PDCCH capability belongs to the first group, the grouping information further includes a first dedicated preamble or a first preamble set used by the UE that has the E-PDCCH capability; or when the grouping information includes determining that the UE whose current status is the connected state belongs to the first group, the grouping information further includes a first dedicated preamble or a first preamble set that can be used by the UE whose current status is the connected state; or when the grouping information includes determining that the UE that has the E-PDCCH capability and whose current status is the connected state belongs to the first group, the grouping information further includes a first dedicated preamble or a first preamble set used by the UE that has the E-PDCCH capability and whose current status is the connected state.

Optionally, the grouping information and the random access response parameter are transmitted in a same message or transmitted in different messages, and both the grouping information and the random access response parameter may be sent to the UE by using any one of the following messages: an RRC message, a MAC layer message, a physical layer message, and a system broadcast message.

In hardware implementation, the foregoing first sending module and second sending module may be a transmitter or a transceiver. The foregoing determined modules may be, in a hardware form, built in or independent of a processor, or may be stored, in a software form, in a memory, so that the processor invokes each of the foregoing modules and performs an operation corresponding to each of the foregoing modules. The processor may be a central processing unit (CPU), a microprocessor, a single-chip microcomputer, or the like.

Figure 10:
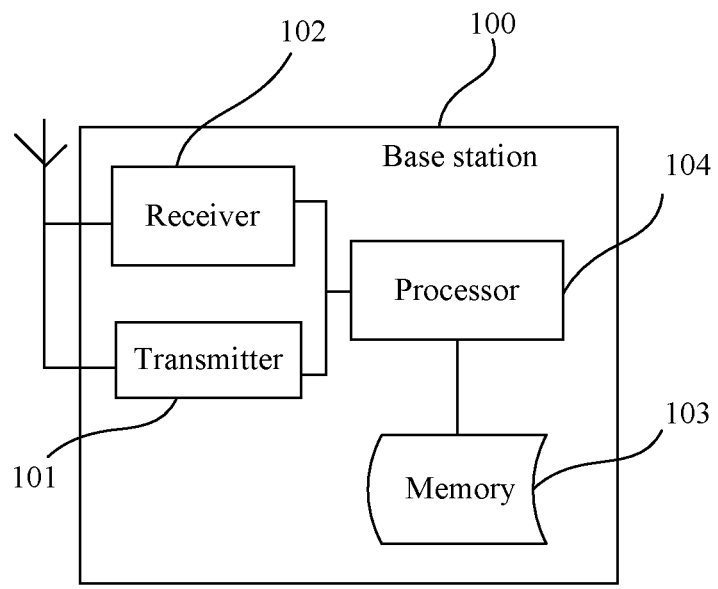
FIG. 10 is a schematic structural diagram of another embodiment of a scheduling signaling transmission device according to the present invention.

Referring to FIG. 10, FIG. 10 is a schematic structural diagram of another device according to an embodiment of the present invention, where the device may be specifically a base station. As shown in the figure, the base station 100 includes a transmitter 101, a receiver 102, a memory 103, and a processor 104 that is separately connected to the transmitter 101, the receiver 102, and the memory 103. Certainly, the base station may further include general components, such as an antenna, a baseband processing component, an intermediate radio frequency processing component, and an input and output apparatus, which are not limited herein in this embodiment of the present invention.

The memory stores a group of program code, and the processor 104 is configured to invoke the program code stored in the memory, so as to perform the following operations:

sending, by using the transmitter, a random access response parameter to UE, where the random access response parameter is used to indicate that scheduling signaling of a random access response is transmitted through an E-PDCCH; and receiving, by using the receiver, a random access preamble sent by the UE, and sending the scheduling signaling of the random access response through the E-PDCCH according to the random access preamble, so that the UE receives, through the E-PDCCH according to the random access response parameter after sending the random access preamble, the scheduling signaling of the random access response.

It should be noted that, base stations shown in FIG. 9 and FIG. 10 may be configured to implement the any method provided in the foregoing method embodiments. Description related to detailed content of the random access response parameter, a specific transmission manner, and the like is the same as that in the foregoing method embodiments, and details are not described herein again.

In this embodiment, by transmitting scheduling signaling of an RAR through an E-PDCCH, interference from a neighboring cell can be reduced, and reliability of the scheduling signaling of the RAR can be improved, thereby shortening a time delay of a random access process. In addition, by transmitting the scheduling signaling of the RAR through the E-PDCCH, a modulation and coding scheme of relatively high performance may be used for UE, thereby reducing an occupied channel resource and improving transmission efficiency.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A scheduling signaling transmission method, comprising:
    sending, by an evolved NodeB (eNB), a random access response (RAR) parameter to user equipment (UE), wherein the RAR parameter is used to indicate that scheduling signaling of a RAR is transmitted through an enhanced physical downlink control channel (E-PDCCH); and
    receiving, by the eNB, a random access preamble sent by the UE, and sending the scheduling signaling of the RAR through the E-PDCCH according to the random access preamble, so that the UE receives, through the E-PDCCH according to the RAR parameter after sending the random access preamble, the scheduling signaling that is of the RAR and that is sent by the eNB, wherein the eNB is a target eNB, and the sending, by an eNB, a RAR parameter to UE comprises:
    sending, by the target eNB, a handover request acknowledge message to a target mobility management entity (MME), so that the target MME sends a forward relocation response to a source MME after receiving the handover request acknowledge message, the source MME sends a handover command to a source eNB after receiving the forward relocation response, and the source eNB sends a handover command to the UE after receiving the handover command sent by the source MME, wherein the handover command sent by the source eNB, the handover command sent by the source MME, the forward relocation response, and the handover request acknowledge message all comprise the RAR parameter.

2. The method according to claim 1, wherein the RAR parameter comprises at least one of the following items:
    indication information used to indicate whether the UE uses the E-PDCCH to receive the scheduling signaling of the RAR;

configuration information of an E-PDCCH;
configuration information of the E-PDCCH used to transmit the scheduling signaling of the RAR; and
indication information used to indicate whether the UE uses a cell-radio network temporary identifier (C-RNTI) to receive the scheduling signaling of the RAR.

3. The method according to claim 1, wherein the receiving, by the eNB, a random access preamble sent by the UE and sending the scheduling signaling of the RAR through the E-PDCCH according to the random access preamble comprises:
receiving, by the eNB, a first dedicated preamble sent by the UE, and sending, through the E-PDCCH, the scheduling signaling of the RAR after receiving the first dedicated preamble.

4. The method according to claim 1, wherein the receiving, by the eNB, a random access preamble sent by the UE and sending the scheduling signaling of the RAR through the E-PDCCH according to the random access preamble comprises:
receiving, by the eNB, the random access preamble sent by the UE, wherein the random access preamble belongs to a first preamble set, and sending, through the E-PDCCH, the scheduling signaling of the RAR after receiving the random access preamble that belongs to the first preamble set.

5. The method according to claim 1, further comprising:
sending, by the eNB, grouping information to the UE, so that the UE performs processing according to the RAR parameter when the UE determines, according to the grouping information, that the UE belongs to a first group, wherein the UE comprised in the first group is UE that can receive the scheduling signaling of the RAR through the E-PDCCH, and wherein the grouping information is used for:
determining that UE that has an E-PDCCH capability and/or whose current status is a connected state belongs to the first group.

6. The method according to claim 5, wherein:
when the grouping information is used for determining that the UE that has the E-PDCCH capability belongs to the first group, the grouping information comprises a first dedicated preamble or a first preamble set used by the UE that has the E-PDCCH capability; or
when the grouping information is used for determining that the UE whose current status is the connected state belongs to the first group, the grouping information comprises a first dedicated preamble or a first preamble set that can be used by the UE whose current status is the connected state; or
when the grouping information comprises determining that the UE that has the E-PDCCH capability and whose current status is the connected state belongs to the first group, the grouping information comprises a first dedicated preamble or a first preamble set used by the UE that has the E-PDCCH capability and whose current status is the connected state.

7. An evolved NodeB (eNB), comprising,
a transmitter;
a receiver;
a memory and
a processor that is separately connected to the transmitter, the receiver, and the memory, wherein the memory stores a group of program code, and the processor is configured to invoke the program code stored in the memory and perform:
sending, by using the transmitter, a random access response (RAR) parameter to user equipment (UE), where the RAR parameter is used to indicate that scheduling signaling of a RAR is transmitted through an enhanced physical downlink control channel (E-PDCCH); and
receiving, by using the receiver, a random access preamble sent by the UE, and sending the scheduling signaling of the RAR through the E-PDCCH according to the random access preamble, so that the UE receives, through the E-PDCCH according to the RAR parameter after sending the random access preamble, the scheduling signaling of the RAR, wherein the eNB is a target eNB, the processor is configured to:
send a handover request acknowledge message to a target mobility management entity (MME), so that the target MME sends a forward relocation response to a source MME after receiving the handover request acknowledge message, the source MME sends a handover command to a source eNB after receiving the forward relocation response, and the source eNB sends a handover command to the UE after receiving the handover command sent by the source MME, wherein the handover command sent by the source eNB, the handover command sent by the source MME, the forward relocation response, and the handover request acknowledge message all comprise the RAR parameter.

8. The eNB according to claim 7, wherein the RAR parameter comprises at least one of the following items:
indication information used to indicate whether the UE uses the E-PDCCH to receive the scheduling signaling of the RAR;
configuration information of an E-PDCCH;
configuration information of the E-PDCCH used to transmit the scheduling signaling of the RAR; and
indication information used to indicate whether the UE uses a cell-radio network temporary identifier (C-RNTI) to receive the scheduling signaling of the RAR.

9. The eNB according to claim 7, wherein the processor is configured to:
receive a first dedicated preamble sent by the UE, and send, through the E-PDCCH, the scheduling signaling of the RAR after receiving the first dedicated preamble.

10. The eNB according to claim 7, wherein the processor is configured to:
receive the random access preamble sent by the UE, wherein the random access preamble belongs to a first preamble set, and send, through the E-PDCCH, the scheduling signaling of the RAR after receiving the random access preamble that belongs to the first preamble set.

11. The eNB according to claim 7, wherein the processor is configured to:
send grouping information to the UE, so that the UE performs processing according to the RAR parameter when the UE determines, according to the grouping information, that the UE belongs to a first group, wherein the UE comprised in the first group is UE that can receive the scheduling signaling of the RAR through the E-PDCCH, and wherein the grouping information is used for determining that UE that has an E-PDCCH capability and/or whose current status is a connected state belongs to the first group.

12. The eNB according to claim 11, wherein:

when the grouping information is used for determining that the UE that has the E-PDCCH capability belongs to the first group, the grouping information comprises a first dedicated preamble or a first preamble set used by the UE that has the E-PDCCH capability; or when the grouping information is used for determining that the UE whose current status is the connected state belongs to the first group, the grouping information comprises a first dedicated preamble or a first preamble set that can be used by the UE whose current status is the connected state; or when the grouping information comprises determining that the UE that has the E-PDCCH capability and whose current status is the connected state belongs to the first group, the grouping information comprises a first dedicated preamble or a first preamble set used by the UE that has the E-PDCCH capability and whose current status is the connected state.

\* \* \* \* \*